United States Patent [19]

Hosoyama

[11] Patent Number: 4,841,442
[45] Date of Patent: Jun. 20, 1989

[54] POS SYSTEM FOR UPDATING LOOK-UP TABLE
[75] Inventor: Osamu Hosoyama, Takasaki, Japan
[73] Assignee: Fujitsu Limited, Kawasaki, Japan
[21] Appl. No.: 813,951
[22] Filed: Dec. 27, 1985
[30] Foreign Application Priority Data
Dec. 27, 1984 [JP] Japan .................. 59-280629
[51] Int. Cl.[4] .................................... G06F 15/20
[52] U.S. Cl. .................... 364/405; 364/900
[58] Field of Search ........... 364/405, 900; 235/379, 235/380, 381

[56] References Cited
U.S. PATENT DOCUMENTS
3,573,739  4/1971  Zeltlin ................ 340/825.39
3,596,256  7/1971  Alpert ...................... 364/200
4,502,120  2/1985  Ohnishi ..................... 364/405

OTHER PUBLICATIONS
Patents Abstracts of Japan, vol. 8, No. 86 (p. 269) [1523], Apr. 19, 1984; & JP-A-59 2175 (Fujitsu K. K.), 01-07-84.
European Search Report, EP 85 30 9443, The Hague, 07-27-86.

Primary Examiner—Jerry Smith
Assistant Examiner—Charles B. Meyer
Attorney, Agent, or Firm—Staas & Halsey

[57] ABSTRACT

A POS system is made up of a central computer and a plurality of POS terminals. The central computer includes a price look-up (PLU) table and informs the POS terminals of the article data in response to a PLU table inquiry demand from a POS terminal. The content of the PLU table is capable of being updated by an update demand from the POS terminals.

15 Claims, 9 Drawing Sheets

POS SYSTEM FOR UPDATING LOOK-UP TABLE

CROSS REFERENCE TO RELATED APPLICATION

This Application is related to co-pending U.S. application Ser. No. 06/814,039, filed Dec. 27, 1985, and assigned to the same assignee as the subject invention.

BACKGROUND OF THE INVENTION

1. Field of the Invention

The present invention relates to a point of sales (POS) system in which a POS terminal can obtain data such as article prices from a central computer having a price look-up (PLU) table storing such article data. More particularly, it relates to a POS system in which article data stored in the PLU table can be immediately and easily updated from individual POS terminals. The POS system of the present invention can be used for sales management in, for example, a department store or supermarket.

2. Description of the Related Art

A POS system is generally used for sales management in department stores and supermarkets, etc. In this system, the central computer is located in an office remote from the POS terminals which are located at each sales counter. This arrangement enables accurate cash management at the time and point of sales, the collection of sales data, and the collection of proceeds data relative to each article sold, etc., to be carried out in real time by the central computer.

In a prior POS system, each POS terminal holds a PLU table storing article data such as unit costs per article, article name, and the classification code for each article (article code). The article code of each article is input to the POS terminal through a keyboard or scanner (bar code reader) provided at the POS terminal and thus calculation of the total proceeds, and the collection of proceeds data, etc., are performed by using the PLU table.

Article data, such as the unit cost of an article, is stored in the PLU table of each POS terminal is often changed on a daily basis, or even during the course of business. Therefore, it is necessary to transmit the article data in the PLU table for each day to each POS terminal, from the central computer, prior to the start of business, to update each day the content of the PLU table in each POS terminal. However, the transmission of the article data to each POS terminal every day takes a long time and involves a complicated procedure. In particular, when the necessity to update the PLU table, for example, to change unit costs, correct erroneous article data, or register new article data into the PLU table, etc., arises during the course of business, the central computer must correct the data in the PLU table and transmit the corrected data to all of the POS terminals. However, this operation wastes time, and during that time service at the POS terminals is interrupted, with the result that customers must be kept waiting for an inordinate length of time. Obviously, it would be preferable if the updating of the PLU table could be performed immediately from individual POS terminals, and the result of the updating be immediately and simultaneously reflected at all other POS terminals in the POS system.

Further, to require each POS terminal to contain the PLU table greatly increases the cost of the POS system.

SUMMARY OF THE INVENTION

Accordingly, it is an object of the invention to provide a POS system in which the central computer contains the PLU table and each POS terminal obtains article data from the central computer at the time of sale, thereby realizing central control of the management of the PLU table, enabling updating of the PLU table at the central computer to be immediately and easily performed from individual POS terminals, and the result of such updating to be immediately reflected at all other POS terminals in the POS system.

According to the fundamental aspect of the present invention, there is provided a point of sales (POS) system comprising a central computer and a plurality of POS terminals connected to the central computer; the central computer including: a look-up table for storing article data for each article of trade; means for sending and receiving a test; means for analyzing the text received by the sending and receiving means; means for searching the look-up table according to the result of the analysis by the analyzing means; means for compiling a response text according to the findings of the search by the searching means; and means for updating the content of the look-up table according to the result of the analysis by the analyzing means; each of said plurality of POS terminals including: means for sending and receiving a text; means for compiling an inquiry demand text demanding article data for each article of trade in the look-up table; means for compiling an update demand text demanding an update of the content of the look-up table; and means for inputting the updated content of the look-up table; wherein the central computer, in response to the inquiry demand text sent from the POS terminal, analyzes the received text by means of the analyzing means, searches the look-up table by means of the searching means according to the result of the analysis, compiles the response text by means of the response text compiling means according to the findings of the search, and sends back the response text by means of the sending and receiving means to each of the plurality of POS terminals, and, the central computer, in response to the update demand text sent from the POS terminals, analyzes the received text by means of the analyzing means, and updates the content of the look-up table to the content designated by the POS terminals by means of the searching means.

BRIEF DESCRIPTION OF THE DRAWINGS

Embodiments of the POS system in accordance with the present invention will ow be described with reference to the accompanying drawings, in which.

DESCRIPTION OF THE PREFERRED EMBODIMENTS

Figure 1:
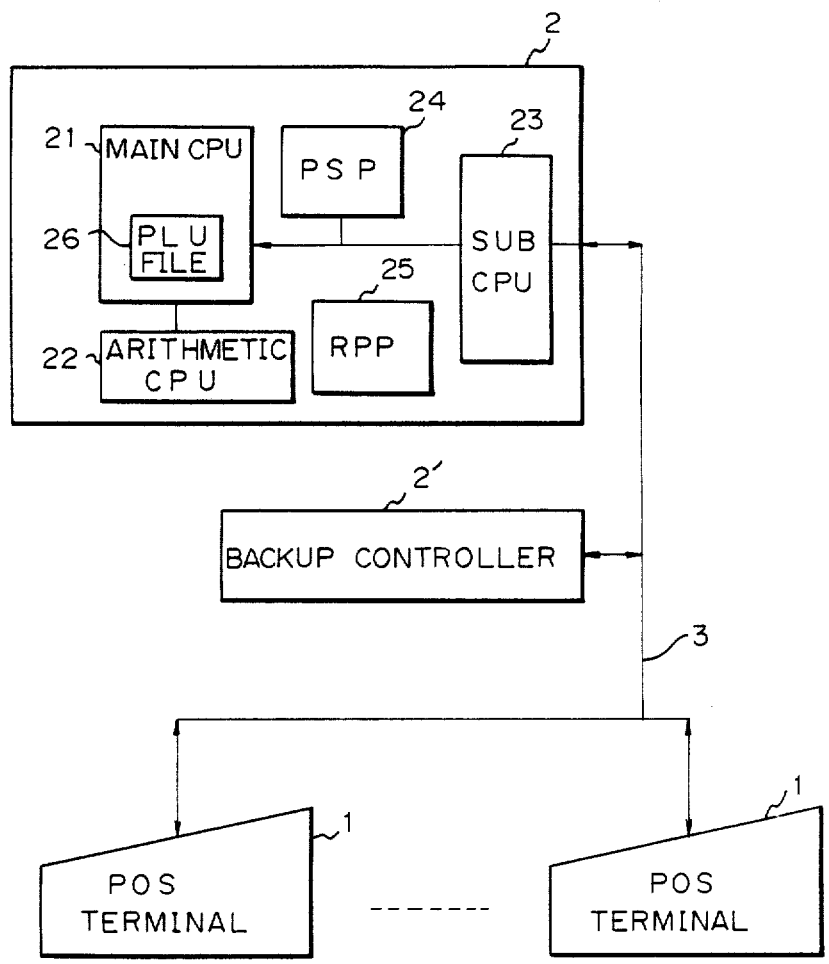
FIG. 1 is a block diagram of a POS system according to the present invention.

FIG. 1 shows one example of the POS system according to the present invention. In FIG. 1, n POS terminals 1 are each connected to two controllers 2 and 2' disposed at an office and acting as central computers via a line 3. The construction of each of the POS terminals 1 is the same, as is the construction of each of the controllers 2 and 2'. The controller 2'is utilized as a backup for the controller 2.

Figure 2:
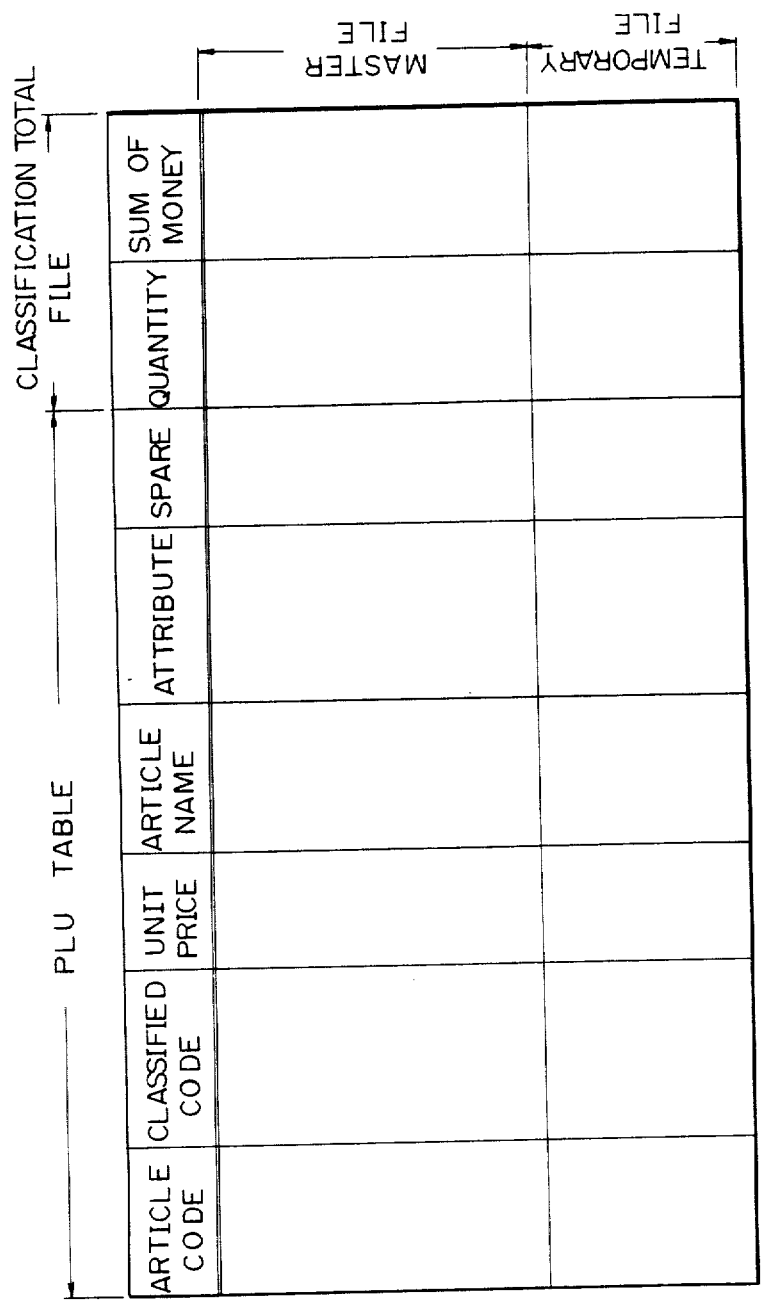
FIG. 2 is a table showing one example of the PLU file provided in the controller.

Each of the controllers 2 and 2' comprises a main central processing unti (CPU) 21 for processing the task demanded by the POS terminals 1, a line sub CPU 22 for executing control of the line 3 for the POS terminals 1, an arithmetic CPU 23 for executing an arithmetic process, a release processing portion 25 for processing a release process when a controller malfunctions, and polling supervisory portion 24 for supervising a polling signal generated at the controller and checking whether the controller is in a normal condition or in a failure condition, etc. The main CPU 21 holds a PLU file 26. The PLU file 26 comprises a PLU table and a classification file, as shown in FIG. 2. The PLU table and classification total file include a master file MF for storing fixed article data and a temporary file TF for storing temporary article data of.

The PLU table stores article data for each article of trade, and comprises columns for article codes, classification codes, unit prices, article names, attributes, and a spare column. The classification total file comprises columns for a quantity and sums of money with respect to the article code.

Figure 3:
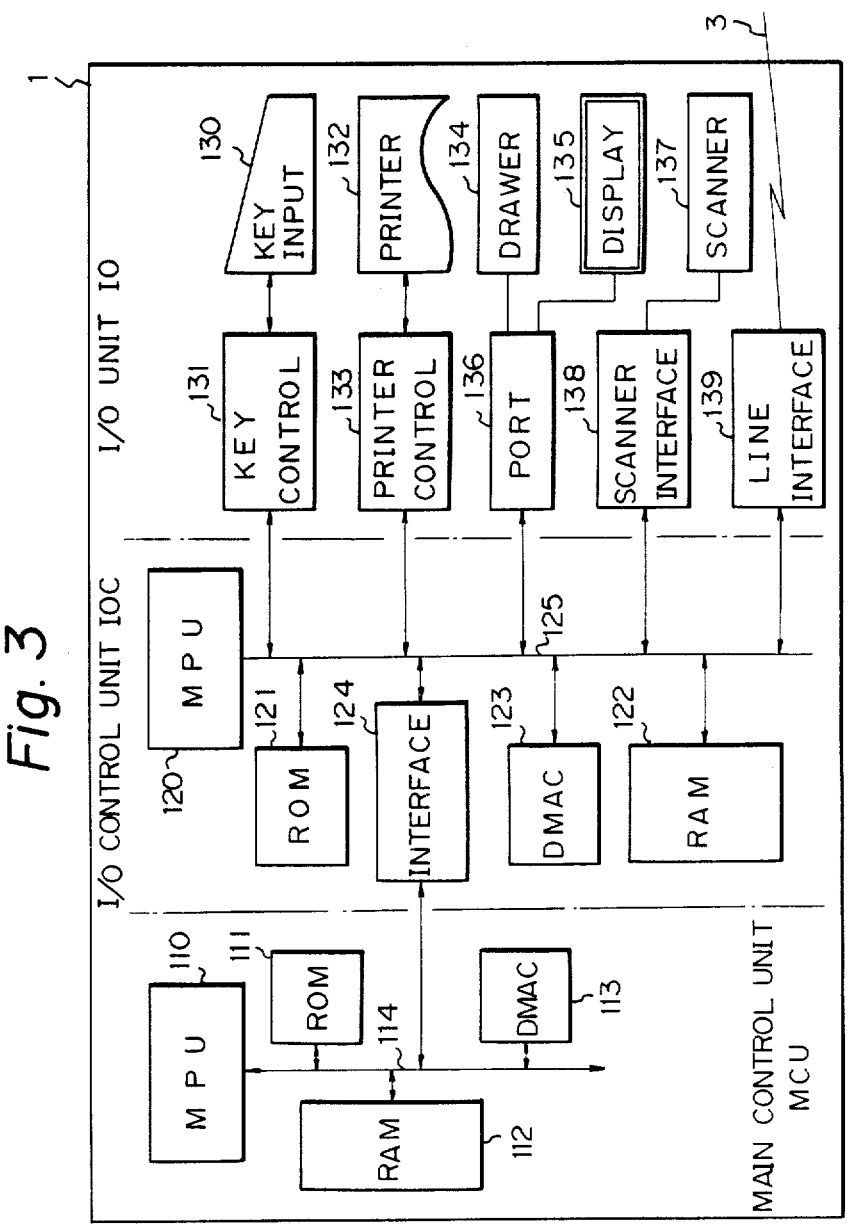
FIG. 3 is a block diagram of the POS terminal according to the present invention.
Figure 4:
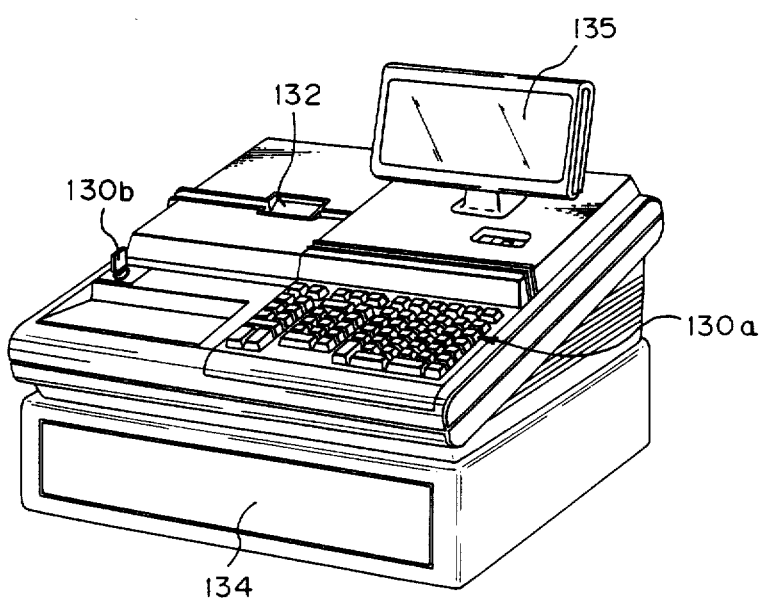
FIG. 4 is a perspective view of the device shown in FIG. 3.

FIG. 3 is a block diagram of one example of the POS terminal according to the present invention, and FIG. 4 is a perspective view thereof. This POS terminal comprises a main control unit MCU, an input/output (I/O) control unit IOC, and an I/O unit IO. In the POS terminal of the present invention, efficiency of the POS terminal is increased in comparison with the prior art POS terminal, because the PLU table is provided in the controller 2. Thus, the POS terminal 1 of the present invention contains two microprocessor units to carry out the alloted tasks. That is, the microprocessor unit in the main control unit MCU executes a main program for carrying out a primary porcess of the POS terminal, and the microprocessor unit in the I/O control unit IOC executes an input/output control subprogram for carrying out the I/O control including communication control for the controller 2.

As shown in FIG. 3, the main control unit MCU executes such processes as an analysis of the data through the I/O control unit IOC, a classification total, and registration. This main control unit MCU comprises a microprocessor 110 for executing the program, a read only memory (ROM) 111 for storing the programs and parameters needed to carry out the process of the microprocessor 110, a random acess memory (RAM) 112 for storing the data needed for the operation of the microprocessor 110, the registration file, and the classified total file, etc., a direct memory access (DMA) controller 113 for executing direct access for the RAM 112 according to the instruction received, and a bus for connecting the microprocessor 110, the ROM 111, the RAM 112, and the DMA controller 113, etc., to one another.

The I/O controller IOC executes key input, a displaying subroutine, scanning, editing, printing, and line controlling, etc., according to the instructions received from the main control unit MCU. The I/O controller IOC comprises a microprocessor 120 for executing the programs for carrying out the I/O processing, a ROM 121 for storing an I/O device controlling subprogram having the function of communicating with the controller 2 to receive the data stored in the PLU table 26 and for carrying out the printing by the printer 132, and the parameters, etc., a RAM 122 for storing the data needed for the operation of the microprocessor 120, a DMA controller 123 for executing the direct access for the RAM 122 according to the instructions received, an interface 124 connected between the main control unit MCU and a bus 125 or the I/O control unit IOC for communicating data and commands between the main control unit MCU and the I/O control unit IOC, and a bus 125 for communicating data and commands between the microporcessor 120, and ROM 121, the RAM 122, the DMA controller 123, and the interface 124. The microprocessors 110 and 120 are coupled together via the interface 124, and the DMA controllers 113 and 123 can access the RAM 122 and 112 of the IOC and MCU units.

Referring to FIGS. 3 and 4, the I/O unit IO comprises a key input portion 130 including a keyboard 130a and a mode selection key 130b for maintenance, etc., a key control portion 131 for detecting operation of the key input portion 130 and sending the input data to the bus 125, a printer 132, a printer control portion 133 for controlling the printer 132, a drawer 134 for storing cash, a display 135 for displaying input data and the result of a process, a port 136 for connecting the drawer 134 and the display 135 to the bus 125, a scanner (bar code reader) 137 for inputting data by scanning the bar code affixed to an article, such as a JAN (Japanese article number), UPC (Universal product code), or EAN (European article number) etc., a scanner interface 138 for sending the data input from the scanner 137 to the bus 125, and a line interface 139 for communicating with the controller 2 via the line 3.

In this POS terminal, the process of the function indicated by the key input portion 130 is executed by the main control unit MCU, and the process for the fundamental I/O control is executed by the I/O control unit IOC. That is, the main control unit MCU and the I/O control unit IOC can access the respective RAMs 112 and 122 via the interface 124 via the DMA controllers 113 and 123 respectively. The ROM 111 of the main control unit MCU stores the main program for the process needed to carry out the primary operations of the POS terminal, such as the classificated total process, register process, price look-up process, and exact calculation process, etc., and the ROM 121 of the I/O control unit IOC stores the input/output control subprogram for controlling the I/O device. Accordingly, the main control unit MCU executes the process for the POS functions, and the I/O control unit IOC executes the process for the I/O control.

Mode of operation

The operations of the present POS system, i.e., the PLU table inquiry operation, the PLU data changing operation, the PLU data creating (new registration) operation, and the emergency PLU data creating operation, will now described, in sequence, with reference to the flowcharts. The PLU table inquiry operation processes inquiries from the POS terminals 1 regarding article data, such as price, to the controller 2. The PLU data changing operation processes changes in the PLU data stored in the PLU table for new data from the POS terminals 1, and the PLU data creating operation processes the registration of new PLU table data sent from the POS terminals 1 into the PLU table.

Figure 5:
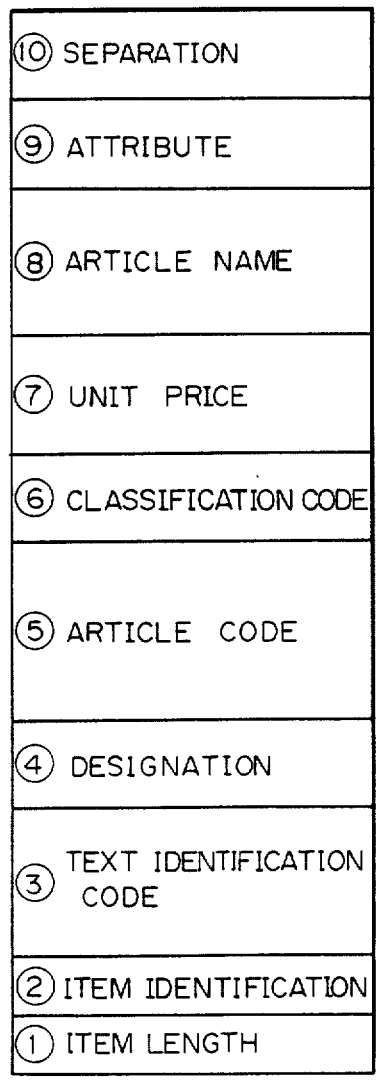
FIG. 5 and FIG. 6 are tables showing one example of the format of the text transmitted between the controller and each POS terminal respectively.
Figure 6:
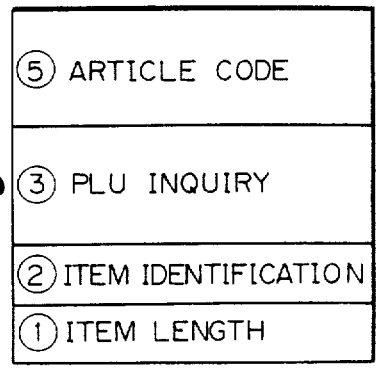

FIGS. 5 and 6 show an example of the format of the text transmitted between the controller 2 and each POS terminal 1, respectively. The text of FIG. 5 comprises the following information sections wherein the information is given upon inquiry:

① item length
② item identification
③ text identification code
   (one of the following may be selected)
   (i) maintenance demand (from the POS terminal 1 to the controller 2)
   (ii) former data (from the controller 2 to the POS terminal 1)
   (iii) new data (from the POS terminal 1 to the controller 2)
   (iv) non-registration (from the controller 2 to the POS terminal 1. The controller 2 sends this text to the POS terminal 1 when the article code indicated by the POS terminal does not exist in the PLU table 26.)
   (v) double registration (from the controller 2 to the POS terminal 1. The controller 2 sends this text to the POS terminal 1 when the article code indicated by the POS terminal for new registration already exists in the PLU table.)
   (vi) busy (from the controller 2 to the POS terminal 1)
   (vii) process finish (OK) (from the controller 2 to the POS terminal 1
   (viii) process NG (from the controller 2 to the POS terminal 1)
④ designation
   the POS terminal 1 instructs the controller 2 to designate a change, creation, erasure or classification of the PLU data by this text
⑤ article code
⑥ classification code
   both ⑤ and ⑥ are input from the POS terminal and used in the case of texts (i), (ii) or (iii)
⑦ unit price
⑧ article name
   both ⑦ and ⑧ are included in the text of (ii) or (iii)
⑨ attribute
⑩ separation FIG. 6 shows the format of the text for sending a PLU table inquiry demand from the POS terminal 1. This text comprises:

① item length
② item identification
③ PLU table inquiry
   (as the text identification data)
⑤ article code.

PLU table inquiry operation

Figure 7:
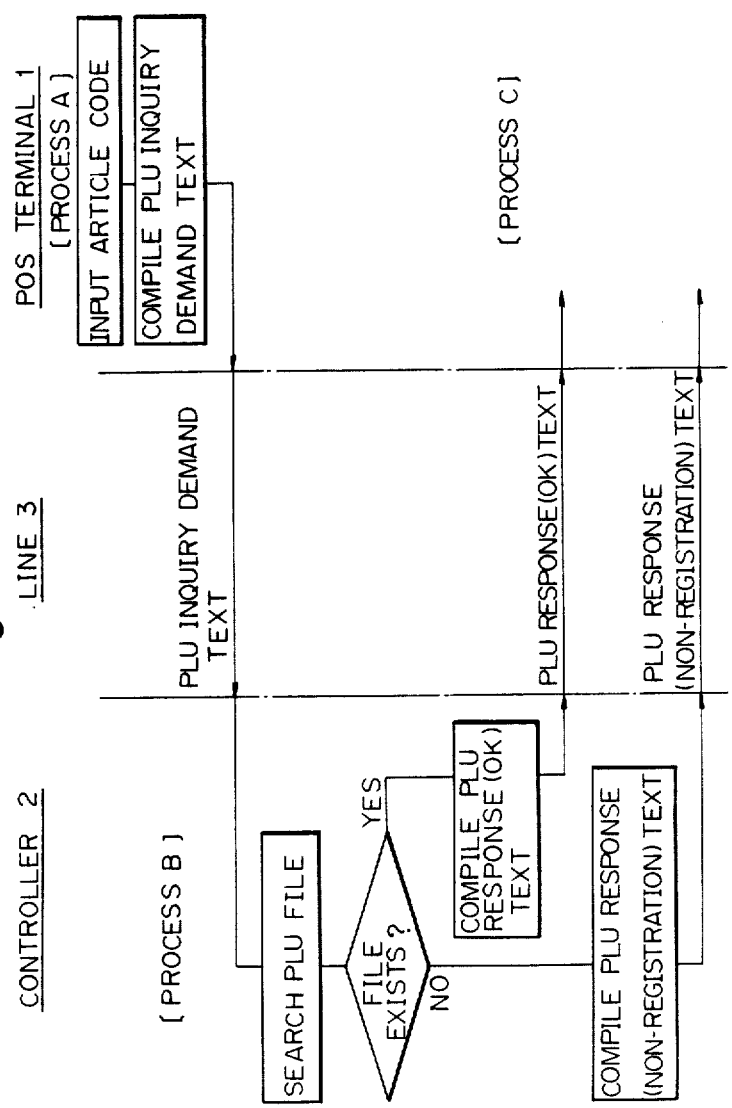
FIG. 7 is a flowchart showing the PLU table inquiry operation.

FIG. 7 is a flowchart showing the process of the PLU table inquiry operation.

(Process A)

When the article code is input by the key input portion 130 or the scanner 137 in accordance with the sale of articles, that article code is sent to the I/O control unit IOC and stored in the RAM 122. The microprocessor 110 is then informed of the input of the article code, by the microprocessor 120, through the interface 124, whereby the microprocessor 110 complies the "PLU inquiry demand" test shown in FIG. 6 on the basis of the article code stored in the RAM 122, and sends that text to the controller 2 via the line interface 139. This PLU inquiry demand text includes the text identification data indicating a PLU table inquiry and the input article code.

(Process B)

In the controller 2, the text from the POS terminal 1 is received by the line sub CPU 23, and transmitted to the main CPU 21. The main CPU 21 analyzes the received text by executing the text analyzing task to distinguish the process demanded. In this case the demanded process is the PLU table inquiry, and therefore the main CPU 21 executes a search of the PLU file 26. First, the temporary file TF is searched, and if the article information is not in the temporary file, then the master file MF is searched. If the article information of the demanded article code is registered in either the temporary file TF or the main file MF, that main CPU 21 compiles the PLU response (OK) text including the classified code, the unit price, the article name, the bank number, and the address, etc., in the text format shown in FIG. 5, and sends it to the POS terminal 1 via the line sub CPU 23.

On the other hand, if the article information of the demanded article code is not registered in the files TF and MF, the main CPU 21 compiles a non-registration text in the format shown in FIG. 5, and transmits it to the POS terminal 1 via the line sub CPU 23.

(Process C)

The PLU response text is received in the POS terminal 1 via the line interface 139, transmitted to the microprocessor 110 under the control of the microprocessor 120, and then stored in the sales details area of the RAM 112. The data stored in the sales details area is then transmitted to the microprocessor 120 as display and print data. When the SUM key at the keyboard is operated, this is acknowledged by the microprocessor 110, via the microprocessor 120, and the summing of the date stored in the sales details area of the RAM 112, is then executed, and the result displayed and printed by the display 135 and the printer 132 respectively. At the same time, the microprocessor 110 compiles a detailed text containing the sales details and sends it to the controller 2 via the line interface 134. Accordingly, the classified total file of the PLU file 26 is updated by the controller 2.

On the other hand, when the POS terminal receives the PLU response test bearing the non-registration indication, the main control unit MCU receives this text via the I/O unit IO and the I/O control unit IOC, analyses the text to determine that the received text is a non-registration text, and then displays that fact on the display 135.

PLU data changing operation

Figure 8:
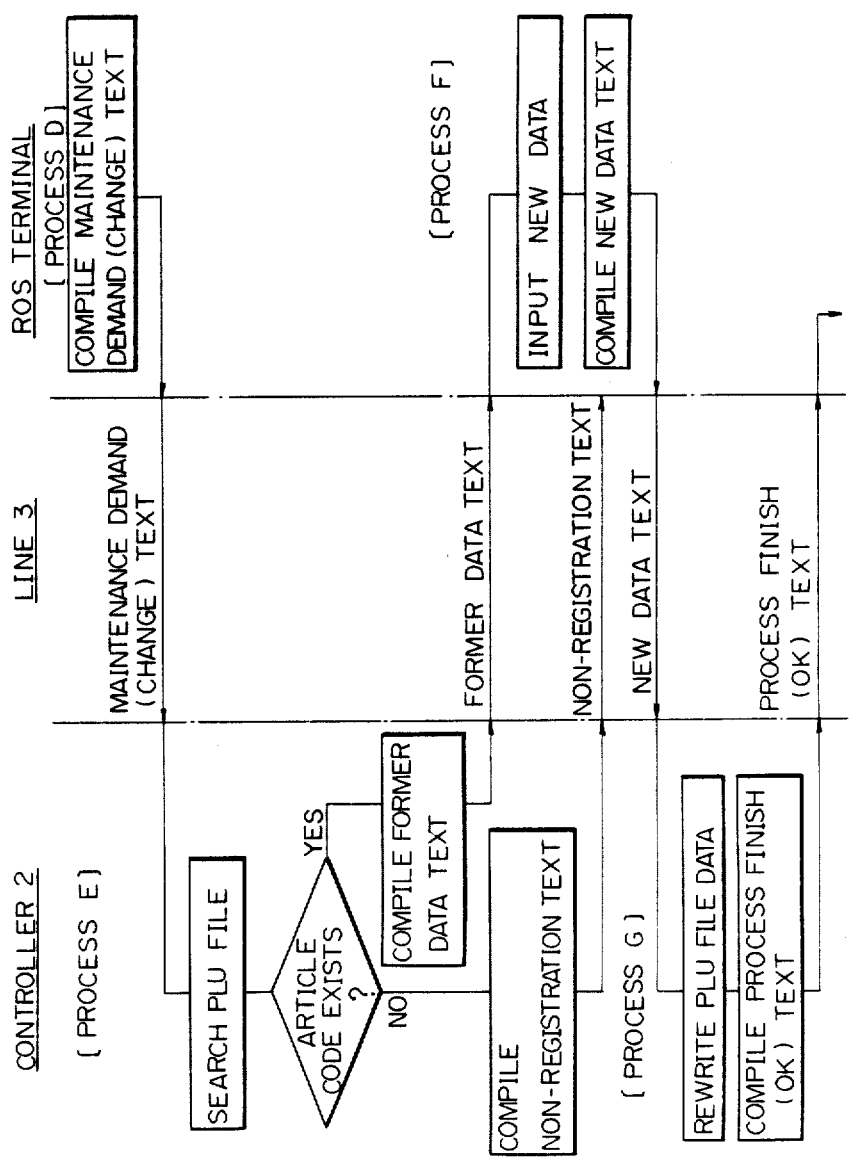
FIG. 8 is a flowchart showing the PLU table changing operation.

FIG. 8 is the flowchart showing the PLU data changing operation.

(Process D)

First, the mode selection key 130b in the key input portion 130 of the POS terminal 1 is set to the PLU data changing position, and the article code is input by the keyboard 130a or the scanner 137. Accordingly, the main control unit MCU compiles the maintenance demand text in which the text identification date ③ is "maintenance demand", the indication ④ is "change", and the article code is written, and then sent to the controller 2 via the I/O control unit IOC, the I/O unit IO, and the line 3.

(Process E)

In the controller 2, when the text is received via the line sub CPU 23, the main CPU 21 analyzes the content of the text to determine that the received text is a maintenance demand text. Then the main CPU 21 searches for the article information of the article code contained in the text by using the PLU file 26.

That is, the main CPU 21 checks as to whether or not the article information corresponding to the article code exists. If the information exists, the former data text in the FIG. 5 format, in which the text identification data is "former data" and the former article information such as the unit price and classified code registered in the PLU table is written, is prepared and sent back to the POS terminal 1 from which the maintenance demand text was received.

On the other hand, if the article information does not exist because of, for example, an input error at the POS terminal 1, the main CPU 21 prepares a non-registration text in which the text identification data is "non-registration" and the unit prices and the classification code, etc., are set to the dummy data "0", then sends it to the POS terminal 1.

(Process F)

In the POS terminal 1, when the text from the controller 2 is received, it is transmitted to the main control unit MCU vis the I/O unit IO and the I/O control unit IOC. The main control unit MCU analyzes the text. As a result of the analysis, when the text is determined to be the "former data" text, the main control unit MCU displays the former data of the article on the display 135 via the I/O control unit IOC. Then the new data to be enterred is input by the key input portion 130. The main control unit MCU then prepares the new data text in which the text identification data is "new data" and contains the new article information such as the unit price, and sends the text to the controller 2 via the I/O control unit IOC, the I/O unit IO and the line 3.

On the other hand, if the text is determined to be a non-registration text, that fact is displayed on the display 135 and, if necessary, the registration (data creation) described hereinafter is executed.

(Process G)

In the controller 2, the received new data text is transmitted to the main CPU 21 via the line sub CPU 23. The main CPU 21 then rewrites the former article information in the PLU table as the new article information indicated by the POS terminal 1. Accordingly, for that and all subsequent PLU inquiry demands regarding the article, each POS terminal 1 is informed of the new data.

When the data changing process is finished, the process finish text in which the text identification data is "process finish", is sent to the POS terminal. Conversely, if the data changing process is not finished, the process NG text in which the text identification data is "process NG", is prepared and sent to the POS terminal 1.

In addition, if the controller 2 is busy when the POS terminal 1 sends the maintenance demand text, the controller 2 prepares and sends a busy text in which the text identification data is "data", to the POS terminal 1.

PLU table new registration operation

Figure 9:
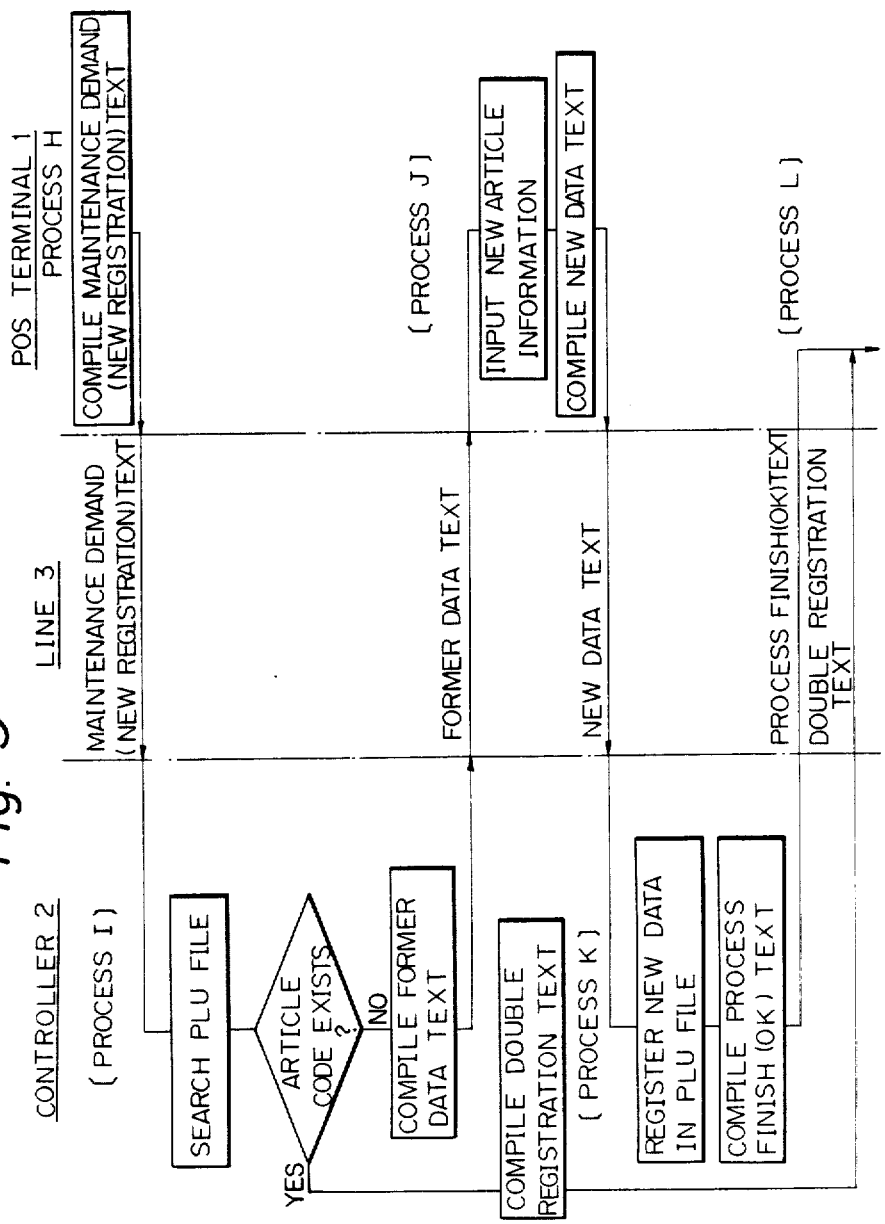
FIG. 9 is a flowchart showing the PLU table new registration operation.

FIG. 9 is a flowchart showing the PLU table new registration operation.

(Process H)

In the POS terminal 1, the mode selection key 130b of the key input portion 130, is set to the PLU table "new registration" position. Then the article code to be registered is input by the keyboard. The main control unit MCU prepares the maintenance demand text in the FIG. 5 format in which the text identification data ③ is "maintenance demand text", the indication ④ is "creation", and the article code is written, and this text is sent to the controller 2 via the I/O control unit IOC, I/O unit IO and the line 3.

(Process I)

In the controller 2, the received text is analyzed by the main CPU 21. The main CPU determines that the received text is the maintenance demand text regarding a new registration, then checks whether or not the article code included in the text exists in the PLU file 26. If not, the former data text regarding the article to be newly registered is prepared. In this case, since the former data does not exist, dummy data is used for the classification code, the unit price, the article name, and attribute, etc., and the memory bank number and the memory address of the temporary file assigned to be registered by the POS terminal are used as the bank number and address. The main CPU 21 sends this former data text to the POS terminal via the line sub CPU 23 and line 3.

Conversely, if the article code already exists in the PLU file 26, the main CPU 21 prepares a double registration text in which the text identification data ③ is "double registration", and sends this text to the POS terminal 1.

(Process J)

In the POS terminal, the received text is transmitted to the main control unit MCU via the line interface 139 and the I/O control unit IOC. In the main control unit MCU, the microprocessor 110 analyzes this text to determine that the text is the former data text, then begins to prepare the new data text.

First, the microprocessor 110 informs the microprocessor 120 via the interface 124 that the article information such as class and price has been input by the key input portion 130. When the article information input by the key input portion 130 is received by the miporcessor 120, the input article information stored in the RAM 122 is transmitted to the RAM 112 via the interface 124 through the DMAC 123 and 113, and the microprocessor 110 is informed of this. The microprocessor 110 prepares the new data text by inserting the new article information into the received former data text, and then sends the new data text to the controller 2.

(Process K)

In the controller 2, the received text is transmitted to the main CPU 21, analyzed, and determined to be the new data text. Then the main CPU registers the new article information, such as the article code, classification code, and unit price of the new data text to the address and the bank number of the temporary file TF included in the new data text. The main CPU 21 also prepares a file maintenance process finish (OK) text and sends the text to the POS terminal.

(Process L)

In the POS terminal, when the file maintenance process finish (OK) text is received via the line interface 139, the microprocessor 120 is informed of this. The microprocessor 120 then informs the microprocessor 110, and the microprocessor 110 accordingly finishes the new registration operation.

Emergency registration operation

Figure 10:
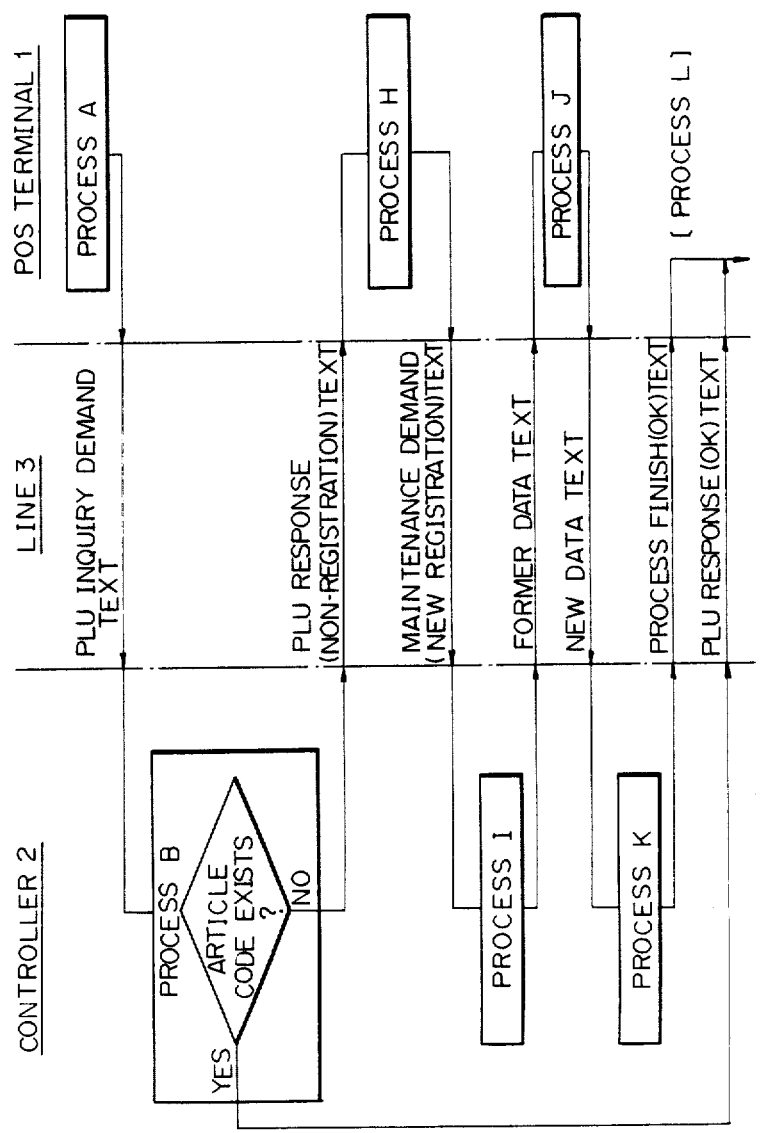
FIG. 10 is a flowchart showing the emergency registration operation.

FIG. 10 is a flowchart showing the emergency registration operation.

When the article information demanded by the POS terminal 1 is not registered in the PLU table, the controller 2 sends the non-registration text to the POS terminal 1. The microprocessor 110 at the POS terminal analyzes the received text, determines that it is a non-registration text, and then executes the emergency registration operation. That is, the file maintenance demand text regarding the new registration, the same as the text described in the process H, is prepared and sent to the controller 2. Then the aforementioned processes I, J, and K are executed, and the emergency registration process is finished.

The processing mode of the controller 2 comprises a queue 1 (PLU table inquiry demand process), queue 2 (file maintenance demand process), and queue 3 (total demand process), and these queues 1, 2, and 3 are given priority in that sequence; that is queue 1 has first priority. Accordingly, if a queue 1 demand is generated while the processes queue 2 or 3 are being executed, the queue 2 or 3 process is temporarily interrupted and the queue 1 process is executed. The queue 2 or 3 process is resumed after the queue 1 process is completed.

In the aforementioned description, the operation for updating the PLU table in the controller from an individual POS terminal so that the result is reflected at all other POS terminals in the system has been explained. However, the system of the present invention is not limited to this operation. Namely, it is possible to change the information stored in all of the POS terminals from by using an individual POS terminal. That is, when wishing to change, for example, the rate of reduction in price stored in each POS terminal, or to indicate a commercial message to be printed on the receipt, this data can be sent to the controller 2 from one POS terminal, and the data then sent to all of the other POS terminals from the controller 2, and thereby the former data in all POS terminals is rewritten as the new data.

The backup controller 2' constantly intercepts communications between the controller 2 and the POS terminals 1 by means of the polling supervisory portion 24, thereby executing a supervisory function over the condition of the controller 2. This interception enables the backup controller 2' to update its PLU table in the same way as the controller 2. Therefore, if the controller 2 malfunctions, the backup controller 2' executes the processes for the PLU inquiry demand, etc., in place of the controller 2, using a PLU table store the most newly updated data.

I claim:

1. A point of sales (POS) system comprising:
a central computer; and
a plurality of POS terminals connected to said central computer, said central computer including:
 a main look-up table for storing article data;
 first means for sending and receiving a text;
 means for analyzing the text received by said first means;
 means for searching the contents of said main look-up table based on the analysis by said analyzing means;
 means for compiling a response text based on the findings of the search by said searching means; and
 means for updating the article data stored in said main look-up table based on the analysis by said analyzing means, each of said POS terminals including:
 second means for sending and receiving a text;
 means for compiling an inquiry demand text which demands an inquiry into the article data in said main look-up table;
 means for compiling an update demand text which demands an update of the content of said main look-up table; and
 means for inputting replacement data to said main look-up table;
 wherein said central computer, in response to receipt of an inquiry demand text sent from one of said POS terminals, causes said analyzing means to analyze the received text, causes said searching means to search the contents of said main look-up table according to the result of the analysis, causes said response text compiling means to compile a response text according to the findings of the search, and causes said first means for sending and receiving a text to send the response text to said one of said POS terminals, and
 wherein said central computer, in response to the update demand text sent from said one of said POS terminals, causes said analyzing means to analyze the received text, and updates the data stored in said main look-up table with updated data input and sent from said one of said POS terminals by changing the data stored in said main look-up table to new data.

2. The POS system according to claim 1, wherein said central computer sends the data in said main look-up table relating to one article to said one of said POS terminals in response to the demand for updating of the data stored in said main look-up table for said article, said one of said POS terminals being capable of displaying the data on a display, compiling the new article data, and sending the new article data to said central computer.

3. The POS system according to claim 2, wherein when the demanded article data does not exist in said main look-up table, said central computer sends a non-registration response text informing said one of said POS terminals that the demanded article information is not registered, and in response to this text, said one of said POS terminals sends a demand text demanding a new registration of the article data to said central computer.

4. The POS system according to claim 1, wherein when the demanded article data does not exist in said main look-up table, the central computer sends a non-registration response text informing said one of said POS terminals that the demanded article information is not registered, and in response to this text, said one of said POS terminals sends a demand text demanding a new registration of the article information to said central computer.

5. The POS system according to claim 1, further including a backup central computer having a backup look-up table, and said backup central computer intercepts communications between said central computer and said POS terminals to thereby update the data in said backup look-up table in the same way as the data in said main look-up table is updated, and if said central computer malfunctions, said backup central computer functions in place of said central computer, using whichever of said main and backup look-up tables contains the most newly updated data.

6. A point of sales (POS) system comprising:
a central computer; and
a plurality of POS terminals connected to said central computer, said central computer including:
a main look-up table for storing article data;
first means for sending and receiving a text; means for analyzing the text received by said first means;
means for searching the contents of said main look-up table based on the analysis by said analyzing means;
means for compiling a response text based on the findings of the search by said searching means; and
means for updating the article data stored in said main look-up table based on the analysis by said analyzing means, each of said POS terminals including:
second means for sending and receiving a text;
means for compiling an inquiry demand text which demands an inquiry into the article data in said main look-up table;
means for compiling an update demand text which demands an update of the content of said main look-up table; and
means for inputting replacement data to said main look-up table;
wherein said central computer, in response to receipt of an inquiry demand text sent from one of said POS terminals, causes said analyzing means to analyze the received text, causes said searching means to search the contents of said main look-up table according to the result of the analysis, causes said response text compiling means to compile a response text according to the findings of the search, and causes said first means for sending and receiving a text to send the response text to said one of said POS terminals, and
wherein said central computer, in response to the update demand text sent from said one of said POS terminals, causes said analyzing means to analyze the received text, and updates the data stored in said main look-up table with updated data input and sent from said one of said POS terminals by creating new data in said main look-up table.

7. A data processing system having a plurality of terminals, which utilizes the findings of a search of a price look-up table as a correspondence table between an article of trade and a price at the time of carrying out a commercial transaction with a customer, and a host controller, wherein:
the host controller is constructed to house said price look-up table, and each of said plurality of terminals is capable of receiving price information corresponding to said article by communicating with said controller at the time of carrying out the commercial transaction;
each of said plurality of terminals is capable of communicating information regarding a table inquiry demand process for receiving said price information from said controller, and is further able to communicate information regarding a table update demand process for updating the content of said table including said price look-up table,
said latter information includes text identification data for indicating the content of the text at the time of updating the content of the table;
former data and new data are communicated between said plurality of terminals and said controller, whereby the former data is changed to the new data as a result of input to the controller from the terminal, and
said changed data is sent to each of said plurality of terminals for all subsequent table inquiry demands from each of said plurality of terminals.

8. An article information inquiry processing system comprising:
a controller including an article table having a look-up table which stores an article code and an article attribute; and
a plurality of terminals, each connected to said controller, for inputting the article code for registration of the article,
wherein each of said plurality of terminals can send the article code to said controller, and receive the corresponding article information from the article table, so that when the article information corresponding to the article code is not registered in the article table in said controller, said controller informs the requesting terminal of the fact, and in response to this information the requesting terminal sends the article information corresponding to the article code to said controller, and said controller then registers that article information in the article table.

9. A sales system comprising:
a central computer including:
first data storage means; and
means for overwriting the contents of said first data storage means; and
a plurality of terminals, each of said terminals including:
means for compiling an overwrite data message; and
means for inputting overwrite data to said first data storage means, so that said central computer, in response to receipt of an overwrite data message, overwrites the contents of said first data storage means with overwrite data input from one of the terminals.

10. A sales system comprising:

a central computer including:
  data storage means;
  first means for sending and receiving a data message;
  means for analyzing data received by said first sending and receiving means; and
  means for overwriting the data in said data storage means;
a plurality of terminals, each of said terminals including:
  second means for sending and receiving a data message;
  means for compiling an overwrite data message; and
  means for inputting overwrite data to said data storage means, so that said central computer, in response to an overwrite data message sent from one of said terminals, causes said analyzing means to analyze the received message and causes said means for overwriting data to overwrite the data stored in said data storage means with overwrite data input and sent from said one of said terminals.

11. A sales system according to claim 10, wherein said central computer further comprises:
  means for searching the contents of said data storage means; and
  means for compiling a response data message; and
each of said terminals further includes:
  means for compiling an inquiry data message, so that said central computer, in response to receipt of an inquiry data message sent from one of said terminals, causes the analyzing means to analyze the received message, causes said searching means to search the contents of said data storage means, causes said response data message compiling means to compile a response data message, and causes said first means for sending and receiving data to send the response data message to said one of said terminals.

12. A method of communication between a central computer capable of storing and analyzing data and compiling, sending, and receiving data messages, and a plurality of terminals, each capable of compiling, sending, and receiving data messages, the central computer and the terminals forming a sales system, comprising the steps of:
  sending an inquiry data message from one of the terminals to said central computer;
  analyzing the received inquiry data message;
  searching the data stored by said computer;
  compiling a response message;
  sending the response message to the one of the terminals which sent the inquiry data message; and
  replacing the data stored by said computer by changing the data stored by said computer to new data.

13. A method of communication between a central computer capable of storing and analyzing data and compiling, sending, and receiving data messages, and a plurality of terminals, each capable of compiling, sending, and receiving data messages, the central computer and the terminals forming a sales system, comprising the steps of:
  sending an inquiry data message from one of the terminals to said central computer;
  analyzing the received inquiry data message;
  searching the data stored by said computer;
  compiling a response message;
  sending the response message to the one of the terminals which sent the inquiry data message;
  sending an overwrite data message from one of the terminals to said central computer;
  analyzing the received overwrite data message; and
  replacing the data stored in the central computer with data input and sent from the one of the terminals which sent the overwrite data message.

14. A method of communication between a central computer capable of storing and analyzing data and compiling, sending, and receiving data messages, and a plurality of terminals, each capable of compiling, sending, and receiving data messages, the central computer and the terminals forming a sales system, comprising the steps of:
  sending an inquiry data message from one of the terminals to said central computer;
  automatically analyzing the received inquiry data message;
  automatically searching the data stored by said computer;
  automatically compiling a response message;
  automatically sending the response message to the one of the terminals which sent the inquiry data message; and
  automatically replacing the data stored by said computer by changing the data stored by said computer to new data.

15. A method of communication between a central computer capable of storing and analyzing data and compiling, sending, and receiving data messages, and a plurality of terminals, each capable of compiling, sending, and receiving data messages, the central computer and the terminals forming a sales system, comprising the steps of:
  sending an inquiry data message from one of the terminals to said central computer;
  automatically analyzing the received inquiry data message;
  automatically searching the data stored by said computer;
  automatically compiling a response message;
  automatically sending the response message to the one of the terminals which sent the inquiry data message;
  sending an overwrite data message from one of the terminals to said central computer;
  automatically analyzing the received overwrite data message; and
  automatically replacing the data stored in the central computer with data input and sent from the one of the terminals which sent the overwrite data message.

* * * * *

UNITED STATES PATENT AND TRADEMARK OFFICE
CERTIFICATE OF CORRECTION

PATENT NO. : 4,841,442

DATED : June 20, 1989

INVENTOR(S) : Osamu Hosoyama

It is certified that error appears in the above-identified patent and that said Letters Patent is hereby corrected as shown below:

Col. 2, line 19, "test;" should be --text--;

Col. 3, line 28, "tion file," should be --tion total file,--;

Col. 4, line 55, "classificated" should be --classification--;

Col. 6, line 11, "test" should be --text--;

line 53, "date" should be --data--;

line 63, "test" should be --text--;

Col. 8, line 13, "data," should be --"busy",--;

Col. 10, line 6, "table store" should be --table to store--.

Signed and Sealed this

Fifteenth Day of May, 1990

Attest:

HARRY F. MANBECK, JR.

*Attesting Officer*  *Commissioner of Patents and Trademarks*